July 15, 1969     M. R. ESTABROOK     3,455,066
FEED RATE CONTROL FOR ABRADING MACHINES
Filed March 10, 1967     2 Sheets-Sheet 1
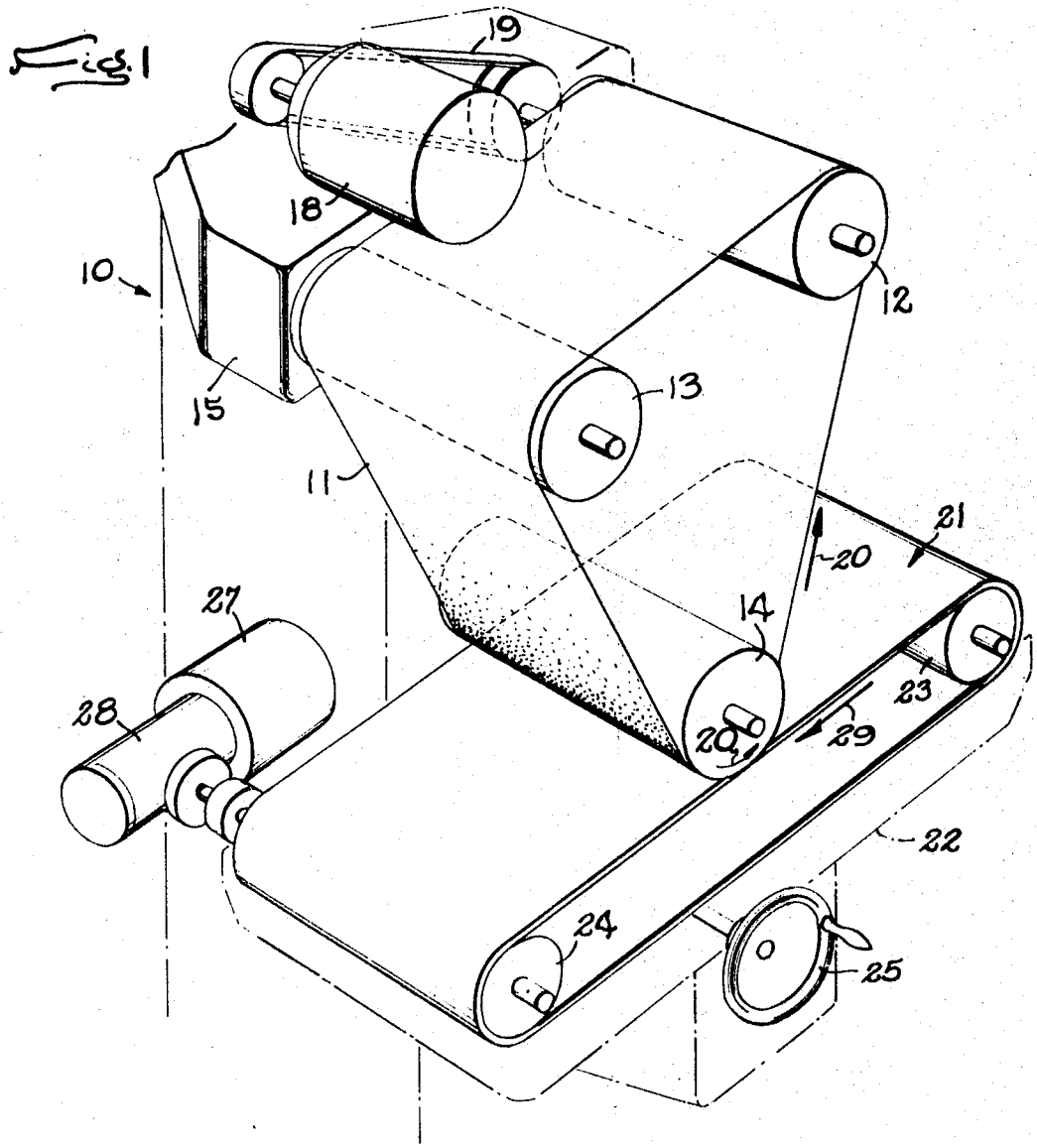
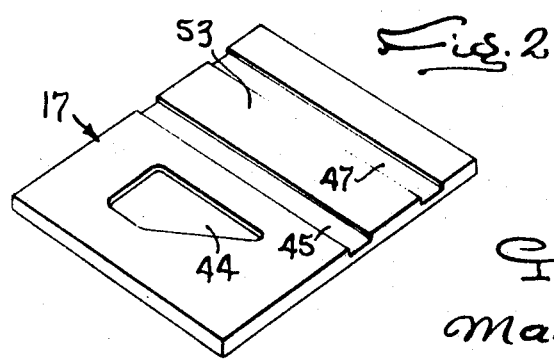
INVENTOR
Mark R. Estabrook
by Wolfe, Hubbard, Voit & Osann
ATTORNEY INVENTOR
Mark R. Estabrook
by Wolfe, Hubbard, Voit & Osann
ATTORNEY United States Patent Office
3,455,066
Patented July 15, 1969

3,455,066
FEED RATE CONTROL FOR
ABRADING MACHINES
Mark R. Estabrook, Rockford, Ill., assignor to Barnes Drill Co., Rockford, Ill., a corporation of Illinois
Filed Mar. 10, 1967, Ser. No. 622,179
Int. Cl. B24b 21/18, 49/10, 51/00
U.S. Cl. 51—138                 6 Claims

ABSTRACT OF THE DISCLOSURE

A belt type abrading machine having an endless abrading belt trained and driven around three rolls supporting the belt above a work-feed conveyor driven by an electric motor through reduction gearing to feed workpieces past the lower or pressure roll opposite the direction of belt movement. A bank of incandescent lamps connected in series with the armature of the conveyor motor automatically varies the terminal voltage of the motor in accordance with the load on the motor to adjust the feed rate in accordance with variations in the surface condition of the work.

Background of the invention

The invention relates to the control of the work feed rate of a belt-type abrading machine in which an endless abrading belt is supported for continuous movement along an endless path and a workpiece is fed past the belt in abrading contact therewith on a conveyor adjacent the pressure-applying roll of the machine. In the past, it has been customary to make two or more constant-speed passes over a workpiece of substantial roughness or irregularity, positioning the conveyor progressively closer to the pressure roll to avoid overloading of the machine as a result of substantial variations in the rate of stock removal.

Summary of the invention

The object of the present invention is to sense changes in the resistance to feed of the work past the pressure roll and automatically vary the speed of the work conveyor in response to such changes to maintain a substantially constant work load on the belt. This makes it possible to handle workpieces with greater surface variations in a single pass, and also increases beltlife by avoiding excessive loading. For these purposes, the conveyor is driven by an electric motor in a direction opposite to the direction of belt movement, and the terminal voltage of the conveyor motor is varied automatically in response to changes in work load by a resistor connected in series with the motor armature and having a resistance value that increases sharply with the current flow through the armature and the resistor.

Other objects and advantages of the invention will become apparent from the following detailed description of the preferred embodiment, taken in conjunction with the accompanying drawings, in which:

Brief description of the drawings

FIG. 1 is a fragmentary perspective view of the basic parts of a belt type abrading machine adapted for use with the present invention.

FIG. 2 is a perspective view of a representative workpiece.

Description of the preferred embodiment

Figure 3:
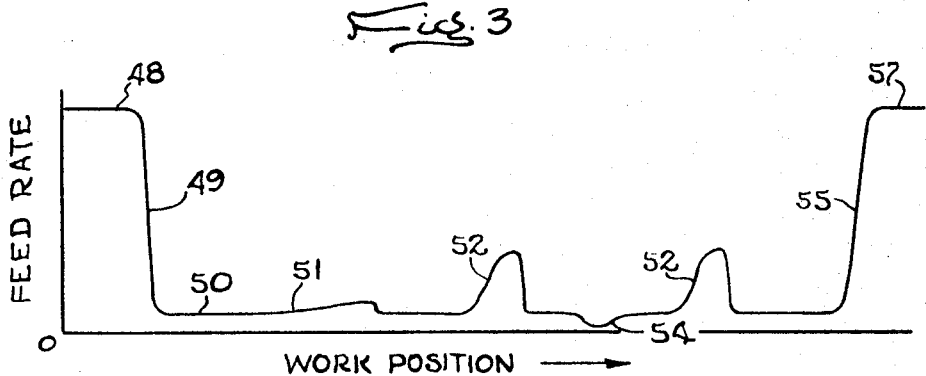
FIG. 3 is a graph illustrating possible variations in feed rate as the machine performs an abrading pass over a workpiece such as that shown in FIG. 2.

As shown in the drawings for purpose of illustration, the invention is embodied in a belt sander 10 (FIG. 1) in which an endless abrasive belt 11 is supported on three generally parallel rotary rolls 12, 13 and 14 arranged on the upper portion 15 of the frame to guide the belt along a generally triangular path with one area of the belt contacting a workpiece to be abraded. The workpiece may take various forms such as a casting 17 (FIG. 2) or a sheet (not shown) of metal having a rough or irregular surface to be finished.

One of the rolls, herein the roll 12, is power driven by a motor 18 and a belt drive 19 to move the belt at high speed along its endless path, in the direction indicated by the arrows 20 in FIG. 1. The drive motor typically operates at a constant speed and the roll 13 is rocked back and forth between two oppositely inclined positions during the abrading operation to induce controlled edgewise travel of the belt 11 in a manner well known to those skilled in the art.

To feed workpieces past the lower or pressure roll 14 in contact with the abrasive belt 11, a conveyor 21 is disposed beneath the pressure roll and supported on the lower portion 22 of the frame at a selected height relative to the belt. Herein, this conveyor is an endless belt approximately the same width as the abrasive belt, and is trained around two elongated rolls 23 and 24 parallel to the pressure roll and suitably journaled on the lower frame on opposite sides of the pressure roll. For precise control of the conveyor height and the depth of cut, the frame includes a rigid backing (not shown) disposed beneath the upper run of the belt and vertically adjustable relative to the upper portion 15 of the frame by means of a hand wheel 25 and the usual screw mechanism (not shown).

As previously stated, it has been customary to drive the conveyor 21 at a substantially constant speed and to make two or more passes for each workpiece when there are substantial surface irregularities that could cause overloading of the machine if the conveyor were set for one cut deep enough to remove all of the irregularities in one pass. In accordance with the present invention, the conveyor is driven with a variable speed that is adjusted automatically in response to variations in the condition of the workpiece, or in successive workpieces, to make it possible to make a deeper cut in a single pass and accommodate greater irregularities without danger of overloading.

Figure 4:
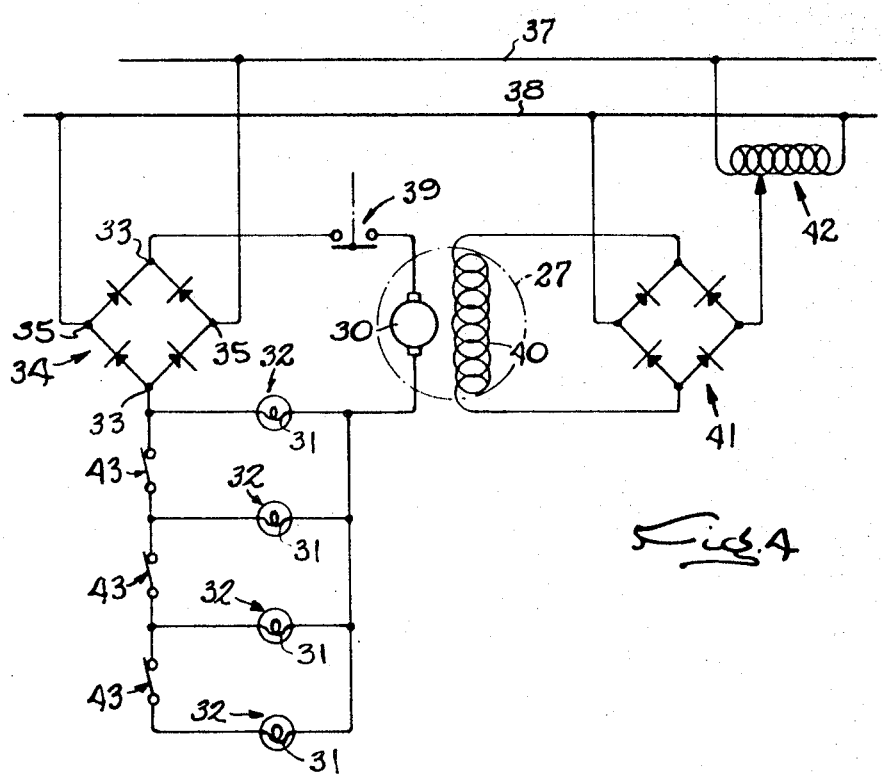
FIG. 4 is a schematic wiring diagram showing the basic elements of a control embodying the novel features of the present invention.

For this purpose, the conveyor 21 is driven by a variable speed and torque electric motor 27 through suitable reduction gearing at 28 in a direction such that the force exerted on the workpiece by the motor 18 opposes the conveyor motor, as indicated by the arrow 29 in FIG. 1, and the terminal voltage of the armature 30 (FIG. 4) of the conveyor motor is varied in accordance with the condition of the work surface by a resistor 31 connected in series with the motor armature and having a resistance value that increases and decreases sharply with increases and decreases in the current drawn by the armature. An example of such a resistor is the tungsten filament of a common incandescent lamp 32 (FIG. 4).

In this instance, the conveyor motor 27 is a D.C. shunt-wound motor on the order of one-half horsepower, and the reduction gearing 28 drives the conveyor roll 24 counterclockwise as viewed in FIG. 1 so that the upper run of the conveyor belt 21 moves from right to left while the abrasive belt is running under the pressure roll 14 from left to right. It is fundamental that the current drawn by the motor armature 30 (FIG. 4) increases and decreases as the load on the motor increases and decreases, because the rate of current flow depends upon the difference between the terminal voltage across the armature and the back voltage generated by the armature. Back voltage, in turn, falls as the motor speed drops, so the voltage differential increases to increase the current flow as the load increases and tends to slow down the motor.

It will be seen that movement of the work by the motor 27 is opposed by the forces applied by the abrasive belt, so that variations in the amount of stock removal produce corresponding varitions in the motor load. With the abrasive belt moving past the pressure roll in a direction opposite to the direction of conveyor movement, all of the force of the abrasive belt opposes the conveyor motor.

A variable resistor like the lamp-bulb filament 31 changes its temperature rapidly in response to changes in the rate of current flow through the filament, and has a positive temperature coefficient so that the resistance value of the filament changes accordingly, increasing as the temperature (and current) increase and dropping as the temperature falls. In terms of current-versus-voltage characteristics, the resistor is non-linear, producing a voltage drop in the armature circuit that increases at a progressively increasing rate. Thus, the resistance value of the filament is responsive to and indicative of the load encountered by the motor.

The speed of operation of the conveyor motor 27 and the torque exerted by the motor depend upon the terminal voltage impressed upon the armature, and this voltage is reduced as the lamp resistance and voltage drop increase. Thus, an increase in load on the motor has the effect of increasing the current drawn by the armature, increasing the temperature and resistance of the filament, and thereby reducing the terminal voltage and modulating the motor speed. This, of course, controls the rate of conveyor feed and the load on the motor and thus automatically controls the feed rate according to the condition of the workpiece.

The basic elements of the control are shown in FIG. 4 wherein it will be seen that the motor armature 30 is wired to the output terminals 33 of a rectifier 34 having input terminals 35 connected to two A.C. power lines 37 and 38. A start switch 39 controls the energization of the armature. The field winding 40 of the motor is similarly connected to the power lines through a rectifier 41, the input to which is selectively adjustable by means of a potentiometer 42 for changing the field strength and the effective power of the motor.

In this instance, a bank of four incandescent lamp bulbs 32, wired in parallel with each other, is interposed in the armature circuit with switches 43 operable to disable one or more of the lamps and leave any selected number, from one to four, effective to reduce the terminal voltage of the armature. By changing the number of lamps in the circuit, the equivalent resistance of the bulb bank at a given armature current may be varied for different performance characteristics. By removing one or more bulbs from the circuit, the maximum (zero speed) current and torque levels are reduced. With a 110 volt A.C. source and a one-half horsepower motor, a representative rating of the bulbs is 200 watts each.

With the foregoing arrangement, the machine is put in operation by starting the belt motor 18, adjusting the height of the conveyor 21 for the desired depth of cut, and activating selected lamps 32 in the circuit of the armature 30 for the desired equivalent resistance in series with the armature. The initial conveyor height may be selected by running the work under the belt until light contact is made, and then raising the conveyor an additional increment that will be the maximum depth of the cut.

It will be seen that the load on the machine will vary not only with surface variations but also with variations in the width of successive workpieces and variations as shown at 44–47 in FIG. 2. When making the same depth of cut on relatively wide parts, the resistance to feeding, and the loading of the abrasive belt and the conveyor motor, are proportionately greater than when operating on narrower workpieces. Thus, the motor power is increased for wider pieces and reduced for narrower pieces by changing the number of lamp bulbs 32 in the circuit or changing the setting of the potentiometer 42. Both changes leave the control in condition to vary the feed rate within a selected range in response to load variations with a given workpiece.

After the motor force range has been selected and the conveyor height set for the desired depth of cut, the workpiece is placed on the conveyor 21 and fed under the abrasive belt 11. Until the work engages the belt, the motor operates at its high, no-load speed as indicated at 48 in the graph in FIG. 3. When the belt engages the work, however, the sudden increase in loading of the conveyor motor 27 causes the motor speed to drop as at 49. This correspondingly reduces the back voltage generated by the armature 30 to increase the current drawn by the armature and, therefore, increase the torque exerted by an amount dictated by the condition of the work surface.

Accompanying the current rise is a corresponding increase in the temperature of the lamp filament 31 (or filaments) in series with the armature 30, and the temperature increase correspondingly raises the resistance value to reduce the terminal voltage of the armature by an amount equal to the rise in equivalent resistance of the bank of bulbs. This, in turn, modulates the conveyor motor speed and torque to suit the demands of the workpiece so that the speed levels off, as at 50 in FIG. 3, and remains substantially constant so long as the work load is substantially the same.

A minor and progressive reduction in the amount of stock being removed is indicated at 51 by the gradual increase in the feed rate. This could be caused, for example, by a reduction in effective work area as shown at 44 in FIG. 2. More substantial reductions are indicated at 52, which represent the drop in surface area at 45 and 47 in FIG. 2. As the resistance to feeding of the work decreases in each case, the motor 27 runs faster and generates a greater back voltage which reduces the rate of current flow through the resistor. This causes a corresponding reduction in resistor temperature and resistance value and thus raises the voltage at the armature. If an abrupt increase in work load occurs, for example, as a result of a high spot at 53 on the workpiece in FIG. 2, the speed drops momentarily as at 54. Finally, after the trailing end of the work clears the belt 11, the speed increases at 55 back to the no-load level at 57. It should be understood that the workpiece shown in FIG. 2 is only one of many types that might be operated on with the machine.

From the foregoing, it will be seen that the present invention provides completely automatic feed speed adjustment throughout the abrading operation and in accordance with the precise requirements of the work itself. Moreover, this is accomplished with a very simple and inexpensive addition to the normal electrical control, preferably one or more standard incandescent lamp bulbs 32, and by reversing the normal direction of conveyor movement so that the belt 11 directly opposes the movement of the work by the conveyor 21.

I claim as my invention:

1. In a belt-type abrading machine, the combination of, a frame, means on said frame for supporting an endless abrading belt for movement along a continuous path, said supporting means including a pressure roll around which said belt extends, a work-supporting conveyor on said frame positioned adjacent said pressure roll to advance a workpiece to be abraded in one direction along a path generally tangent to the pressure roll for contact with said belt, means for driving said belt to move the latter around said pressure roll in contact with the workpiece in a direction opposite to said one direction, a variable speed and torque electric drive motor for said conveyor having an armature that draws current at a rate that increases with the load on said motor, mechanism including reduction gearing drivingly connecting said motor to said conveyor and driving the latter in said one direction along said path, and an automatic control for said motor including a resistor connected in series with said armature and having a resistance value that increases and decreases sharply with increases and decreases in the rate of current flow through the resistor whereby the terminal voltage of said armature varies to adjust the rate of feed of said conveyor according to the varying resistance to such feeding by said belt.

2. The combination defined in claim 1 in which said resistor has a current-versus-resistance characteristic that varies non-linearly with the resistance, increasing and decreasing with, and at a greater rate than, increases and decreases in the current through the resistor.

3. The combination defined in claim 1 in which said resistor has a positive temperature coefficient and generates heat to change its own temperature in proportion to changes in the current.

4. The combination defined in claim 3 in which said resistor is of the type used as filaments in incandescent lamp bulbs.

5. The combination defined in claim 4 including a plurality of such resistors connected in parallel with the first resistor, and means for selectively activating and deactivating different combinations of resistors to vary the equivalent resistance in series with said armature for different performance characteristics.

6. In a belt-type abrading machine, the combination of, a frame, means on said frame for supporting an endless abrading belt for movement along a continuous path and driving said belt continuously in one direction, said supporting and driving means including a pressure roll around which said belt extends, a work-supporting conveyor on said frame adjacent said pressure roll and positioned to hold a workpiece to be abraded and feed the workpiece past said pressure roll for abrading contact with the belt, means for driving said conveyor to feed a workpiece thereon past said pressure roll, said conveyor-driving means including a variable speed and torque electric motor having an armature that draws current at a rate that increases with the load on the motor, and an automatic control for said motor including a resistor connected in series with said armature and having a resistance value that increases and decreases sharply with increases and decreases in the rate of current flow through the resistor whereby the terminal voltage of said armature varies with the load on said motor to adjust the rate of feed of said conveyor according to varying resistance to such feeding exerted by said belt.

References Cited
UNITED STATES PATENTS

| | | |
|---|---|---|
| 2,129,049 | 9/1938 | Doran. |
| 3,132,451 | 5/1964 | Kile _____ 51—138 |
| 3,394,501 | 7/1968 | Carlson _____ 51—138 |

HAROLD D. WHITEHEAD, Primary Examiner

U.S. Cl. X.R.

51—165